(12) United States Patent
Grehant

(10) Patent No.: US 10,963,811 B2
(45) Date of Patent: Mar. 30, 2021

(54) RECOMMENDATIONS BASED ON PREDICTIVE MODEL

(71) Applicant: DASSAULT SYSTEMES, Velizy Villacoublay (FR)

(72) Inventor: Xavier Grehant, Colombes (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 882 days.

(21) Appl. No.: 15/395,021

(22) Filed: Dec. 30, 2016

(65) Prior Publication Data

US 2017/0193401 A1    Jul. 6, 2017

(30) Foreign Application Priority Data

Dec. 31, 2015 (EP) .................................... 15307194

(51) Int. Cl.
*G06N 20/00* (2019.01)
*G06F 16/22* (2019.01)
(Continued)

(52) U.S. Cl.
CPC ............. *G06N 20/00* (2019.01); *G06F 16/22* (2019.01); *G06F 16/2272* (2019.01);
(Continued)

(58) Field of Classification Search
CPC ........ G06N 20/00; G06N 20/10; G06N 20/20; G06N 7/005; G06F 22/2272;
(Continued)

(56) References Cited

U.S. PATENT DOCUMENTS

| 8,762,299 B1 | 6/2014 | Breckenridge et al. |
| 2012/0284213 A1 | 11/2012 | Lin et al. |

(Continued)

FOREIGN PATENT DOCUMENTS

| EP | 2 940 606 A1 | 11/2015 |
| JP | 2007-41960 | 2/2007 |

(Continued)

OTHER PUBLICATIONS

Jeske, Daniel R. "Generation of Synthetic Data Sets for Evaluating the Accuracy of Knowledge Discovery Systems." Proceedings of the Eleventh ACM SIGKDD International Conference on Knowledge Discovery in Data Mining. Aug. 21-24, 2005. pp. 756-762. (Year: 2005).*

(Continued)

*Primary Examiner* — Shane D Woolwine
(74) *Attorney, Agent, or Firm* — Oblon, McClelland, Maier & Neustadt, L.L.P.

(57) ABSTRACT

The invention notably relates to a computer-implemented method for selecting an appropriate decision by constraining options assessed with a model. The method comprises selecting a model capable of receiving inputs and providing output in response to an input; training a model with a set of data representing similar events; generating options that represent hypothetical events; computing target values by applying the trained model on the generated options; computing index for indexing the generated options and target values associated with the trained model; querying the said index for obtaining a selection of a set of options, the selection being performed according to a specific constraint; returning, as a result of the query, a subset of the set of the generated options, the subset being ranked according to the target values associated with each option.

12 Claims, 3 Drawing Sheets

(51) Int. Cl.
*G06F 16/35* (2019.01)
*G06F 16/2455* (2019.01)
*G06F 16/901* (2019.01)
*G06N 7/00* (2006.01)
*G06F 16/903* (2019.01)

(52) U.S. Cl.
CPC ........ *G06F 16/24553* (2019.01); *G06F 16/35* (2019.01); *G06F 16/901* (2019.01); *G06N 7/005* (2013.01); *G06F 16/90335* (2019.01)

(58) Field of Classification Search
CPC .... G06F 22/24553; G06F 22/35; G06F 16/22; G06F 16/2272; G06F 16/24553; G06F 16/35; G06F 16/901; G06F 16/90335
USPC ......................................................... 706/12
See application file for complete search history.

(56) References Cited

U.S. PATENT DOCUMENTS

| | | | |
|---|---|---|---|
| 2013/0103617 A1 | 4/2013 | Desai | |
| 2014/0046879 A1 | 2/2014 | Maclennan et al. | |
| 2014/0188768 A1 | 7/2014 | Bonissone et al. | |
| 2014/0258189 A1 | 9/2014 | Schmidt | |
| 2014/0358828 A1* | 12/2014 | Phillipps | G06N 20/00 706/12 |
| 2015/0006442 A1 | 1/2015 | Ogilvie et al. | |
| 2015/0317357 A1* | 11/2015 | Harmsen | G06N 5/025 707/723 |
| 2016/0019271 A1* | 1/2016 | Ma | G06Q 30/00 707/756 |
| 2016/0104093 A1* | 4/2016 | Fletcher | G06Q 10/06393 705/7.39 |
| 2016/0115778 A1* | 4/2016 | van Oort | E21B 44/00 175/27 |
| 2016/0209546 A1* | 7/2016 | Ramsay | G01V 99/005 |

FOREIGN PATENT DOCUMENTS

| | | |
|---|---|---|
| WO | WO 02/06953 A1 | 1/2002 |
| WO | WO 2015/26858 A1 | 8/2015 |

OTHER PUBLICATIONS

Extended European Search Report dated Jun. 30, 2016 in Patent Application No. 15307195.6.
Extended European Search Report dated Jun. 30, 2016 in Patent Application No. 15307196.4.
Extended European Search Report dated Jun. 30, 2016 in Patent Application No. 15307194.9.
Extended European Search Report dated Jun. 30, 2016 in Patent Application No. 15307193.1.
Office Action dated Dec. 22, 2020 in Japan Patent Application No. 2016-255145 (with English translation); 10 pages.
Office Action dated Jan. 5, 2021 in corresponding Japanese Patent Application No. 2016-255137 with English Translation.

* cited by examiner

RECOMMENDATIONS BASED ON PREDICTIVE MODEL

CROSS-REFERENCE TO RELATED APPLICATIONS

This application claims priority under 35 U.S.C. § 119 or 365 to European Application No. 15307194.9, filed Dec. 31, 2015. The entire contents of the above application(s) are incorporated herein by reference.

FIELD OF THE INVENTION

The invention relates to the field of computer programs and systems, and more specifically to a method, system and program for selecting appropriate decisions by constraining possible options assessed with the help of a machine learning model.

BACKGROUND

Recommendations are used for decision making in engineering. For instance, in an ongoing satellite launch, recommending emergency actions is needed to minimize a function of the risk of incidents (e.g. controlling the temperature of the fuel tanks, fuel consumption, speed of the launcher . . . ) Recommendations are not limited to the control of a device, but they can also be used during the conception and the manufacturing of a device, e.g. a CAD system may provide recommendations during the design of a device so that the risk of malfunctioning of the designed device is minimized.

There are several known categories of recommendation systems. A first category comprises the so-called recommender systems that are systems in which a visitor receives content suggestions based on the contents already visited. For instance, a search engine ranks search results based on personal history of pages visited. Examples of such systems are discussed in Balabanović, Marko, and Yoav Shoham. "*Fab: content-based collaborative recommendation.*" Communications of the ACM 40.3 (1997): 66-72, or also in Sarwar, Badrul, et al. "*Item-based collaborative filtering recommendation algorithms.*" Proceedings of the 10th international conference on World Wide Web. ACM, 2001.

However, these recommender systems work in applications that centralize the history of a large number of users. For example Google© search has more than 1 billion users. Systems that are hosted on the server of a company do not have such a pool of decision-makers to learn from. Decision-makers typically use best business practice or management consulting firms for advice based on accumulated experience of their peers in similar situations. But the relative isolation of business, operational and equipment data from different companies make it difficult to automate this learning process by computer programs. So rather than looking at the history of decisions from their peers, decision-makers assess situations based on data descriptive of the situation that triggers the need for a decision (variables descriptive of their own operations and equipment for instance). Therefore, these recommender systems are not suited for these situations.

A second category comprises the rule based systems that automate decision making related to certain problems. Based on rules written by experts are applied automatically. When the number of options is small and the input variables are manageable by a person, or processed to be summarized in a manageable set of discriminative variables, then it is possible for an expert to specify rules that will produce the optimal action in most cases. The first approach is called "expert rules only" wherein the rules are manually written by an expert of the technical filed on which the system will be applied. The second approach is called "expert rules combined with empirical models" in which an empirical model is built based on machine learning to process the available inputs and return a manageable number of inputs. Such models would typically return an estimated probability. The room for human error is reduced because the complexity of the inputs provided to human-written rules is reduced.

However, this second category suffers many drawbacks; notably, the two approaches do not work when the number of independent factors and the number of options lead to a problem not manageable by a human expert. An approach of the type «expert rules only» will not entirely capture the contribution of all input variables, and an approach of the type «expert rules combined with empirical models» will either lead to an incomplete empirical model (if all independent factors are not represented in the input variables) or lead to a model not understandable by a human expert. A human expert who does not understand the model will not be able to assess its relevance in presence of new information that did not exist or was not taken into account when training the model.

An example of empirical models, include the empirical rule generation systems such as Delmia OI©. These systems illustrate the complexity required to handle such phenomena. Empirical rule generation systems model phenomena described by large numbers of variables. They work by producing many rules with individually low recall and low precision, and therefore potentially mutually contradictory, resolving their different outcomes with a vote, and outputting the result of the vote, which is used as a new synthetic variable to describe the situation. These systems typically achieve simultaneously high recall and high precision (above 80% each) but to do so, produce an unmanageable number of rules (to the order of tens of thousands to millions for a few dozen variables) that could not have been produced by experts.

Such systems can be successfully used in approach "expert rules combined with empirical models", except as to providing a model that an expert can fully understand in cases with many input parameters and a relatively small number of options.

However, such empirical models do not let decision-makers take into account data that did not exist or was not taken into account when training the systems and writing the expert rules. In addition, empirical models require substantial hardware resources to train. In practice the need for decisions is typically triggered by new data. And decisions typically have to be taken quickly. Thus further restraining the amount of resources available and the number of cases where these systems can be used.

A third category comprises understandable models, representations and interactive interfaces that help make decisions, by presenting the relevant information in a form that makes it manageable by the decision-makers or their aids. For instance, Business Intelligence tools provide means to select variables and visualize their interactions for instance by way of scatter plots. Analysts pick relevant visualizations, produce static reports and send them to decision-makers.

The so-called "Whitebox models" rely on empirical (trained) model giving a visualization or explanation of the relationships between the variables. For instance, after training decision trees (as discussed for example in Quinlan, J. Ross. "*Induction of decision trees.*" Machine learning 1.1 (1986): 81-106. [1]), rules building engine, or bayesian networks (as discussed for example in Heckerman, David, Dan Geiger, and David M. Chickering. "*Learning Bayesian networks: The combination of knowledge and statistical data.*" Machine learning 20.3 (1995): 197-243), it is possible to understand the rules that, with some probability, link a target variable to a number of premises among the variables that describe the phenomenon.

When input data can be represented in a graph, techniques exist to map the graph into a 2-dimensional drawing in such a way that the distance between two entities on the 2D map is representative of their connectivity in the graph. These techniques allow to qualitatively represent the degree of interaction between elements descriptive of the situation. These techniques can also be applied to map complex observations on a 2D map so that similar observations (close in N dimensions, where the dimensions are the variables descriptive of the observations) end up close to one another on the 2D map, as discussed for example in Balasubramanian, Mukund, and Eric L. Schwartz. "*The isomap algorithm and topological stability.*" Science 295.5552 (2002): 7-7.

Clustering techniques are discussed in Jain, Anil K., M. Narasimha Murty, and Patrick J. Flynn. "*Data clustering: a review.*" ACM computing surveys (CSUR) 31.3 (1999): 264-323 and these clustering techniques allow to group together in a manageable number of groups observations that are similar in N dimensions.

Dimension reduction techniques are discussed in Wall, Michael E., Andreas Rechtsteiner, and Luis M. Rocha. "Singular value decomposition and principal component analysis." A practical approach to microarray data analysis. Springer US, 2003. 91-109, and they allow finding of the dimensions, or combination of dimensions, along which data varies the most.

Other techniques exist to find what dimensions (descriptive variables) have the highest impact on the value of a given target variable.

However, the "Whitebox models" suffer several drawback. Notably, these systems still do not provide fully automated decisions and therefore allow for suboptimal decisions due to human error such as omission of an important factor or inaccurate estimate of the actual impact of the factors taken into account.

Within this context, there is still a need for an improved method for selecting appropriate decisions by constraining possible options assessed with the help of a machine learning model.

SUMMARY OF THE INVENTION

It is therefore provided a computer-implemented method for selecting an appropriate decision by constraining options assessed with a model. The method comprises:
  selecting a model capable of receiving inputs and providing output in response to an input;
  training a model with a set of data representing similar events;
  generating options that represent hypothetical events;
  computing target values by applying the trained model to the generated options;
  computing an index for indexing the generated options and target values associated with the trained model;
  querying the said index for obtaining a selection of a set of options, the selection being performed according to a specific constraint;
  returning, as a result of the query, a subset of the set of the generated options, the subset being ranked according to the target values associated with each option.

The method may comprise one or more of the following:
  training the model further comprise collecting a set of data representing similar events; training the model based on the collected set of data representing similar events;
  the set of data representing similar events comprises a set of observations wherein each observation is defined with variables: identifying target variables on the set of observations, a target variable being a variable; identifying measurable variables on the set of observations, a measurable variable being a variable that can be measured in a current observation of a current event that is similar to the past events; identifying actionable variables on the set of observations, an actionable variable being a variable that can be acted upon based on the decision of a user;
  training the model further comprise computing a set of data that are generated from a set of simulations; training the model based on the generated set of data;
  generating the options that represent hypothetical events comprises defining each variable of each observation as continuous segments or as discrete sets of possible values of the said each variable; generating the options by generating values on the segments of definition or sets of possible values for the respective variables;
  generating the options further comprises, for each option to be generated: selecting an event among the similar events represented by the set of data; and setting a variable at the option to be generated based on the value of the variable of the selected event;
  the step of generating values is performed with the use of a random variate generator;
  determining dependencies between the variables of the observations of the set; removing events among the generated events whose variables do not satisfy the determined dependencies;
  one or more variables of one or more observations are transmitted in real time;
  generating new options from the transmitted one or more variables; computing target values by applying the trained model to the new options generated; and updating the said index by indexing the generated new options and the computed values;
  the constraint according to which a selection is performed by querying the said index applies to the variables transmitted in real-time and is set using the values transmitted in real-time;
  the options of the set of options are the generated options.

It is further provided a computer program comprising instructions for performing the above method.

It is further provided a computer readable storage medium having recorded thereon the computer program.

It is further provided a server comprising a processing circuitry coupled to a memory, the memory having recorded thereon the above computer program.

The server may be connected to a client computer from which the query on the said index is generated.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
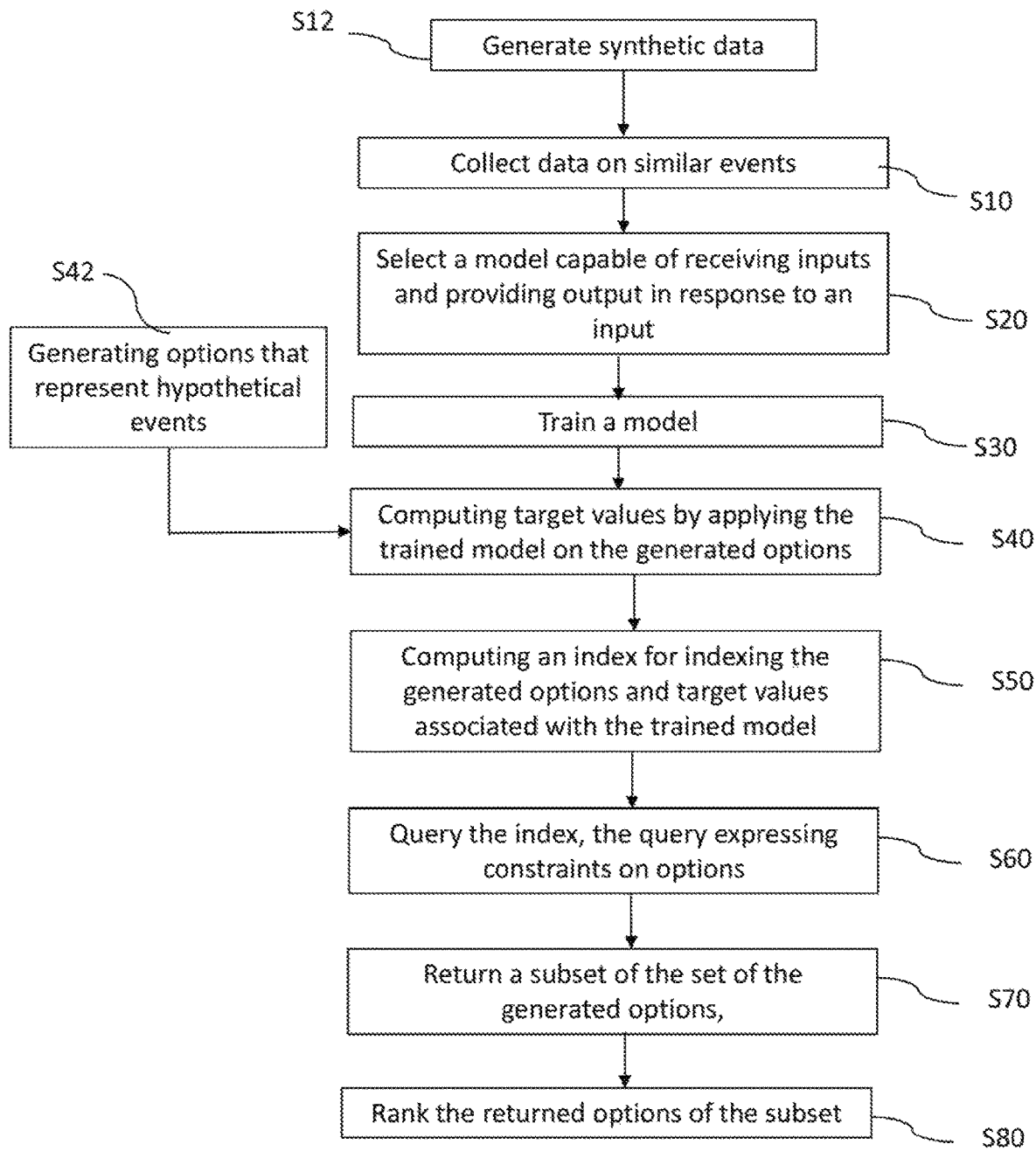
FIG. 1 shows a flowchart of an example of the invention.

With reference to the flowcharts of FIG. 1, it is proposed a computer-implemented method for selecting an appropriate decision by constraining options assessed with a model. The method comprises selecting a model capable of receiving inputs and providing output in response to an input. The method further comprises training a model with a set of data representing similar events. The method also comprises generating options that represent hypothetical events. The method further comprises computing target values by applying the trained model on the generated options. The method also comprises computing an index for indexing the generated options and target values associated with the trained model. Then the method comprises querying the said index for obtaining a selection of a set of options, the selection being performed according to a specific constraint. Next, the method comprises returning, as a result of the query, a subset of the set of the generated options, the subset being ranked according to the target values associated with each option.

Such a method improves the selection of an appropriate decision by constraining options assessed with a model. Indeed, the invention consists in making predictions using any type of model, but then instead of returning the options of highest predicted outcome, it consists in indexing the options and the corresponding outcomes, and accepting constraints from the decision maker before ranking by outcome. For example, the decision maker can make a query that does not specify any constraint first and see if the returned recommendations are applicable. If not, they can add a constraint in the form of a new query that filters inapplicable recommendations.

The invention makes it possible to integrate in the premises of the recommendation knowledge not available at the time of training the model. As a first consequence, the invention makes it possible for decision makers to influence the recommendation that is provided to them. It gives them control on the process that produces the recommendation. They can appropriate the recommendation and are more prone to use it. As a second consequence the invention makes it possible to use models that would require to be updated frequently to remain relevant (for situations that evolve quickly), but cannot be updated frequently enough because of the limited computing resources available (re-training a model typically takes a lot of CPU time and RAM, especially when many variables are necessary to represent the situation). For example, if an engine of the shuttle does not provide the expected thrust to reach an orbit, the model learning from data collected from former missions will not know that an engine has this problem (for instance, this problem has never been faced in the past) and might suggest to perform a change of orientation of the shuttle which is not appropriate. The chief of the mission can apply as a constraint that the engine does not provide the expected thrust. As opposed to "whitebox systems" and conceptual displays, the invention provides an automated selection of options: possibly, no user action is required while the best option is selected. This improves the management of devices and systems.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

By indexing, it is meant storing observations including their target values in a way that is meant to optimize queries by values on a predefined set of variables (these variables are said to be 'indexed'). Variables should be stored in inverted lists. An inverted list is a list of values, with for each value a list of pointers. Each pointer points to the stored observations for which this value occurs. Inverted lists allow for quick query by value. In some variables the notion of order and the difference between values is important. For instance if lap L1 occurs with temperature T1=22 C, temperature T2=23 C, temperature T3=30 C, T1 and T2 are more similar than T2 and T3 with regards to the temperature. For these variables, query by segment is meaningful. When indexed, these variables are typically stored on the supported physical memories that provide the fastest read access. This is to allow for the quick query of all observations for which the value of the given variable may fall into the segment. One approach for querying by segment is to index discretized values (rounded to a certain level of precision) and to query all the discrete values comprised in the segment. An index stores data as documents with associated metadata. A document is an observation and the associated input and target values are metadata.

Figure 2:
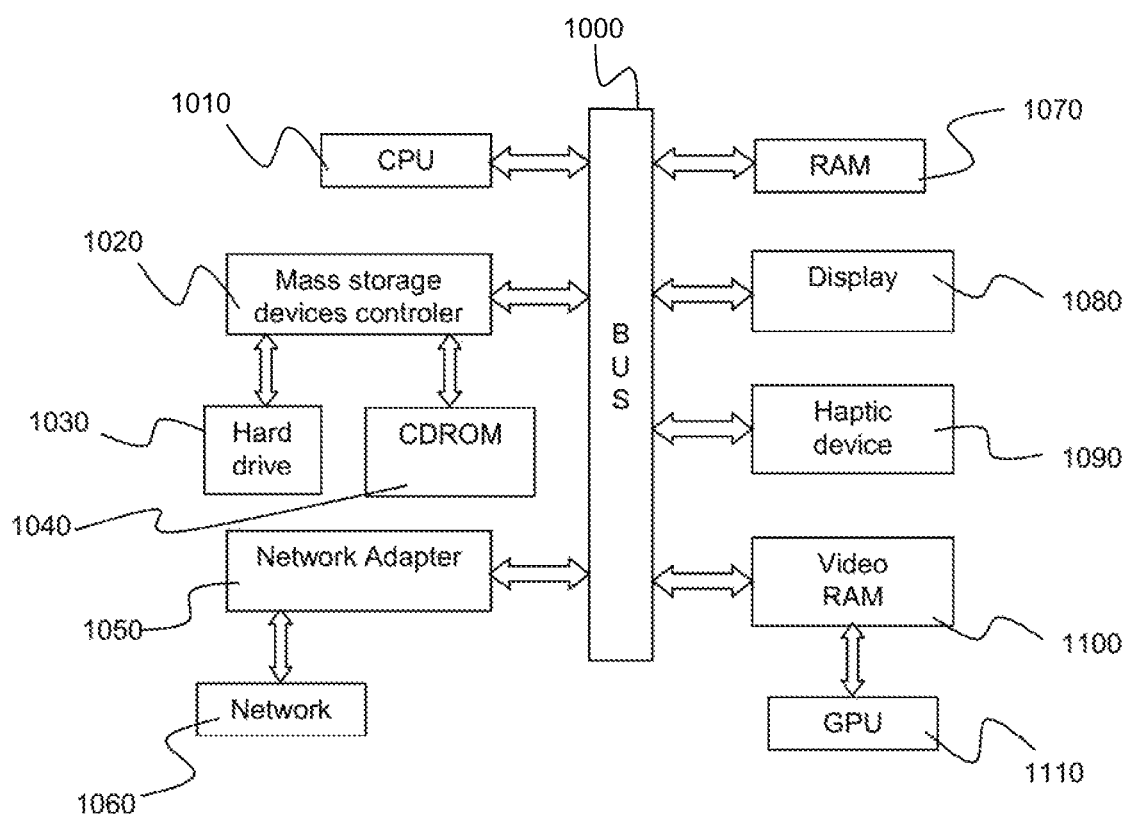
FIG. 2 shows an example of a computer.

FIG. 2 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method generally manipulates sets of observations. An observation is a set of variables, wherein each variable is associated with a value. A variable represents a state of a system or of a part of it, or the state of an element in relation with or which has an influence on the system or a part of it. For instance, the variables of an observation of a car can be the temperature of the car, the oil pressure, instant fuel consumption, average fuel consumption during a race, the kind of tyres, the temperature of the air, the weather (rain, sun, snow), . . . . The variable is associated with a value that quantifies the state of the variable. An observation represents a state of the system at a given point in time. A set of observations is thus the value of the variable at different point in time. In practice, the system can belong in various and unlimited industrial fields, including: aerospace, architecture, construction, consumer goods, high-tech devices, industrial equipment, transportation, marine, and/or offshore oil/gas production or transportation. The set of observations used by the method may thus comprise the variables related to an industrial system which may be any mechanical system, such as system of a terrestrial vehicles or a part of it (including e.g. car and light truck equipment, racing cars, motorcycles, truck and motor equipment, trucks and buses, trains), a system of an aerial vehicle or a part of it (including e.g. airframe equipment, aerospace equipment, propulsion equipment, defense products, airline equipment, space equipment), a system of a naval vehicle or a part of it (including e.g. navy equipment, commercial ships, offshore equipment, yachts and workboats, marine equipment), a general mechanical system or a part of the mechanical system (including e.g. industrial manufacturing machinery, heavy mobile machinery or equipment, installed equipment, industrial equipment product, fabricated metal product, tire manufacturing product), an electro-mechanical or electronic system or a part of it (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Figure 3:
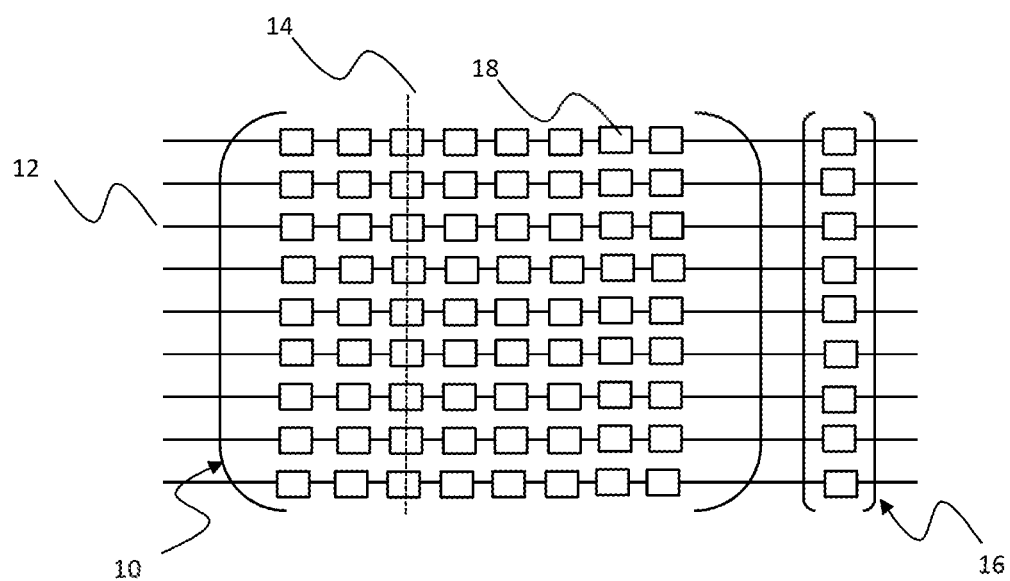
FIG. 3 shows an example of a set of observations.

FIG. 3 shows an example of observations. Each line 12 represents an observation, each column 14 (only one is represented with a dotted line in FIG. 3 for clarity reason) corresponds to a variable, and each rectangle 18 represents the value of a variable for an observation. In this example, the set of observations is stored on a matrix 10. Each observation is described with its values on so-called «descriptive variables» also known as «input variables» (because they are provided as input of a trained model to describe an observation). Interestingly, each observation of the set comprises the same variables as the other observations of the set. It is to be understood that for each observation, one or more variable can be empty, that is, not associated with a value. Each observation is associated with corresponding values on so-called «target variables» also known as «output variables». The target variables are the variables that trained models must evaluate for new observations. Target variables are meaningful for the user of the model in the sense that they provide information that help the user of the model understand and/or predict and/or react to the behavior of the system. In this example, the target variables are also stored in a matrix 16. It is to be understood that the values and the target variables of each observation can be stored in a single matrix comprising the matrices 10 and 16. The observations and the target variables form (and are referred to as) a set of tagged data. It is to be understood that each target variable is accompanied of a value so-called target value for each observation.

In reference to FIG. 1, it is discussed a build time of the present invention during which a model is trained from data of past events that are similar events.

At step S10, data on similar events are collected. Similar events means that the events have common characteristics. In practice, the collected data are observations of similar events, each observation being associated with one or more variables. The common characteristics between the events can be the variables that describe the events. Hence, and in reference to FIG. 3, each observation of the set of observations describes an event that is described with the same variables, excepted that the variables between two observations may have different values.

It is now discussed an example of how data on past similar events are collected, that is, how the set of observations is built. Each variable is a column of the matrix of observations, while the observations themselves are the rows of the same matrix. Each element of the observation matrix, at the intersection of column C and row R is the value of variable C for observation R. Three categories of variables may be identified among the set of data. The variables of a first category are referred to as target variables. The target variables are the variables that trained models must evaluate for new observations. Target variables are meaningful for the user of the model in the sense that they provide information that help the user of the model understand and/or predict and/or react to the behavior of the system. Each target variable is associated with a target value.

The variable of a second category are referred to as actionable variables. Actionable variables are the variables on which the decision maker can act. For instance, the speed of a space shuttle is an actionable variable as it can be modified by the flight crew of the shuttle.

The variable of a third category are referred to as measurable variables. These variable are measured during the current event.

Actionable and measurable variables form the descriptive variables of an observation.

When the set of observations is built, the variables of the observations are categorized according to these three categories, e.g. the matrix of FIG. 3 is built so that the variables of a same category are grouped in contiguous columns of the matrix. For the sake of the explanation it is noted that variables can be simultaneously actionable variables (the decision maker can act on them) and measured variables (they are measured in the current event).

It is now discussed an example in which the observations are not measured, but generated from a set of simulations (S12). Each simulation provides measures for each variable, and each simulation simulates a course of events under different circumstances. For instance, many landings of a space shuttle can be simulated, and each simulation provides the variables (both actionable and measurable) associated with the course of events (landing).

For instance, it is possible to generate multiple simulations that differ by different values of actionable variables at any point of the simulation, and by the following course of events, that are also likely to differ by the values of the corresponding observations on multiple variables.

To generate changes in the values of actionable variables at any point of the simulation, on may use random variate generators on the range of definition of the variable, possibly following a uniform distribution on the range of definition, or any other probability distribution consistent with the typical distribution of values of the variable.

Next, at step S20, a model that predicts target values of the collected data is selected. A model can be selected from available machine learning libraries, for example Python Scikit-learn. For example, a stochastic gradient boosting model can be selected. Tools exist to train the model on past data and choose model parameters (within open source companies, or by software such as that provided by Dataiku or BigML). The selected model is capable of receiving inputs and providing output in response to an input, as known in the art.

Then, at step S30, the selected model is trained with the set of data representing similar events; typically, the model is trained with the set of observations related to similar past or simulated events. The method for training a model varies from one model to another. For example, training an Artificial Neural Network involves using the Backpropagation algorithm to update characteristics of the neurons of the network based on how the network behaves prior to the update in response to a new observation being inputted to the network, and based on the difference between the output of the network and the target value associated with the observation. Training an Ensemble model such as Gradient Boosting or Random Forest involves selecting many subsets of observations and for each subset training a simple estimator such as a Stub to output the target values given the observations of the subsets, and adding the trained estimator to the list of estimators of the overall Ensemble model. Training a Stub (=a one-level Decision Tree) involves selecting the variable and the values of that variable that best discriminates among selected observations those associated with different target values.

Machine learning libraries typically implement a method for training each available model and provide that method to the user of the library. The user can train a model by inputting this method with a selection of observations and their target values, which will be used as training data. The method usually returns a pointer to a trained model that can then be used to predict target values given new observations.

Still in reference to FIG. 1, the run time of the present invention is now discussed.

At step S42, options that represent hypothetical events are generated. Hypothetical events means that the events may or not be carried out. An option is an event that differs from an actual event only by differences in the values of actionable variables. That is, when a set of observations describe a current unfolding of events in which the user may take a decision, the user may decide to select options among the ones whose values on non-actionable variables are the same as the observation that best describes the situation when the action is taken.

For example, say observations are described by variables "Cabin Fire" (yes/no), "Fire Extinguisher Status" (on/off), "Current Procedure" (as defined in the Flight Data File). "Fire Extinguisher Status" is an actionable variable, and "Current Procedure" as well, to some extent (you cannot skip procedures, e.g. you cannot be in countdown and suddenly decide to switch to orbital_abort). In an event described by the situation Cabin Fire=yes, Fire Extinguisher Status=off, Flight Level=countdown, the decision to use fire extinguishers and pause the countdown translates into the selection of the option defined by Cabin Fire=yes, Fire Extinguisher Status=on, Flight Level=countdown_paused.

In order to generate a representative set of options, continuous variables can be approximated with nominal variables, i.e. variables that take a finite number of values and every value of the nominal variable can be enumerated. Approximating an arbitrary variable with a nominal variable is done by finding a lower and higher bound, and discretizing the variable. The values of any variable are defined on continuous segments or on discrete sets of possible values. In practice, variables that represent a physical event only take values on a segment, i.e. there is a lower bound and an upper bound. These bounds can be found, typically by looking at past data. To discretize the variable, one method consists in determining an acceptable precision. Typically, only values rounded at the precision level and between the lower and higher bounds are kept. Alternatively, values can be generated using random variate generators on the range of definition of the variable, possibly following a uniform distribution on the range of definition, or any other probability distribution consistent with the typical distribution of values of the variable.

Then, options are generated by combining possible values of their variables. For example if a variable A takes values [1, 2, 3] and variable B takes values [1, 2], the combinations are (1, 1), (1, 2), (2, 1), (2, 2), (3, 1), (3, 2). That is |A|*|B| combinations.

The number of generated options can be however very important. In order to reduce the number of combinations, a strategy may consist in determining dependencies between the actionable variables of the observations and removing combinations among the computed combinations that do not satisfy the determined dependencies. For instance, the altitude and the flight path angle of a space shuttle can be determined as being dependent: a combination that would not satisfy this dependence would be deleted among the generated combinations. Another strategy consists in generating values that correspond to small divergences with regards to the planned procedures (e.g. defined in the Flight Data File in the case of satellite launch) before the course of the event, and generating values that correspond to small divergences with regards to the actual unfolding of events during the course of the event. For example, this can be done by use of a random variate generator for each variable simulating a distribution centered on the value planned in the normal procedure, and then centered on the value measured in the course of the event. For the sake of explanation, a random variate generator is a program that generates particular outcomes of random variables according to their probability distributions on their range of definition.

Next, at step S40, target values are computed by applying the trained model on the generated options. That is, target variables are predicted for each option previously generated. Applying a trained model consists in inputting the trained model with the option. Machine learning libraries typically provide a pointer to a model after training, and a method to input a new observation to the trained model and receive the corresponding target value in response.

A target value is the value of a target variable evaluated for an observation. The target value is either given (typically for past observations) or estimated by a trained model (typically for new observations). In the context of this invention the target variable is typically something the user wants to influence by acting on actionable variables. Hence the target value typically gives information on how desirable an option is. For instance, in the previous example, 'Expected Mission Status at Termination' (failed/ongoing/succeeded) or 'Expected Mission Costs at Termination' (value in million dollars) are possible target variables. These values can be estimated by a trained machine learning algorithm given a current observation and provided sufficient descriptive variables. In particular, an option being an observation (not realized, but hypothetic before the decision is taken and action is made), every option can be assessed by its estimated target value. In the example above, the option to turn on the fire extinguishers and pause the countdown would be assessed by the expected outcome on the success of the mission and its overall costs.

Hence the computation of the target values is performed by applying the trained model on the generated options.

At this step of the run time, the system performing the method has computed target values corresponding to each option, each option being described by measurable variables and actionable variables. The measurable variables describe the context of the decisions and the actions, the actionable variables describe the decisions and the following actions. The target value describes the result on the target variable of the decision and following actions given the context. Said otherwise, a prediction is available for each combination of options using both the measurable data collected during the current event(s) and the generated data for actionable variables.

During the event, the measured data of the measured variables are preferably transmitted in real time to the system. This can be done by means of subscription to real time push notifications from data providers or sensors via any telecommunication channel, and subscription or messaging protocol. It is to be understood that the channel typically depends on the interface provided by the data provider or the sensor.

Next, at step S50, an index is computed for the computed options of step S42 and the computed target values of step S40. In practice, a single index is computed for both options and the target values. To index, the current observations including their target values are stored. The variables are indexed as searchable metadata associated with each option. To do so, they are stored in inverted lists. An inverted list is a list of values, with for each value a list of pointers. Each pointer points to the stored observations for which this value occurs. There is at least an inverted list for each actionable variable; that is for each option. Inverted lists allow for quick query by value.

Then, at step S60, a query is received by the index. This means that the server hosting the index received a query generated by a user, e.g. a client computer connected on the server. The query aims at obtaining a selection of a subset of the computed options that are indexed, and the selection is performed according to specific constraints specified in the query. The specific constraints apply on one or more variables. The constraint is typically a set of equalities and/or inequalities on the values of the variables descriptive of an option. Applying the constraints leads to discard some options and as a result consider other ones.

The constraint may include constraints on measurable variables according to the measured values in the current unfolding of events, and constraints on actionable variables to filter out options based on information not known at the time of training the model. For example if the action takes place during the first stage of flight, and if the fire extinguishers have suddenly stopped working, constraints may include «Current Procedure=first_stage AND NOT Fire Extinguisher Status=on» meaning that we're only interested in options that describe possible decisions and their outcome in the context of the event (during the first stage of flight) and feasible given the new information at hand (in particular, since the fire extinguishers stopped working, it is not an option to turn them on).

As previously mentioned, variables can be transmitted in real time. Thus, a constraint according to which a selection is performed by querying the index applies to the variables transmitted in real-time and is set using the values transmitted in real-time.

As a result of the query, the index returns predictions that match the query, at step S70. This means that the server hosting the index generated a set of computed options from the subset of options of the query.

The subset of the set may be ranked (or sorted) according to a function of the target values associated with each option of the subset (S80). This advantageously provides the user with a quick identification of the best option when the measure of desirability of an option depends on multiple variables. Multiple models can be trained to estimate one target variable each, and the options can be ranked according to a function of the multiple variables.

The ranked subset is thus transmitted to the user, e.g. the client computer connected on the server.

As discussed in reference with steps S40 and S50, the variables can be transmitted in real time. This means that new options can be continuously generated from the transmitted variables to account for potential divergences from the current events, and the potential decisions that could be taken in response for those divergences. New target values may be computed for each new option. And therefore, new indexing is performed for the new options and predictions: the index is updated with the documents corresponding to the generated new options and the computed new target values. Indexes are typically able to handle intense real-time flows of data. So indexing can typically be carried out as options are generated and predictions are provided. Generating options by use of random variate generators is a process typically carried out quickly, and estimating the target values for new options (predictions) as well. Machine learning algorithms are typically slow to train, but quick to run once trained. Hence there is no part of the process that places inconvenient restrictions to the continuous flow of operations.

It is now discussed an example of the invention helping mission control crew and on-board crew to make decisions during the operation of an orbiter for the launch of a satellite.

It is true that in these operations, most actions are effected according to automated programs and planned procedures. Set of guidelines and planned events are in the Flight Data File. The Flight Data File includes the crew activity plan, payload handbooks, and other documents which are put together during the elaborate flight planning process. Types of problems are segmented and actions are planned in advance with the objective to anticipate every type of problems.

However, the mission control crew and on-board crew still need to take decisions at all times. For example, NASA states that among all abort modes, the abort-to-orbit is the preferred mode when possible, and one reason is that it gives controllers and flight crew the time to assess the situation, and decide to land or continue as planned, and how fix the problem. However this time is expensive as the mission is on hold, resources are being consumed, and the problem may be aggravating. When abort-to-orbit is not possible, the speed and quality of the decisions are even more important.

Several variables can be measured for a space shuttle: engine throttle for each engine, fuel levels for each engine, cabin pressure (problem if depressurization), status of orbiter cooling systems (problem if loss of one), altitude, flight path angle, heading, weight, velocity/range, pressures on the vehicle's surface, electrical system status, current procedure (countdown/first stage/second stage/Return to Launch Site/Trans-Atlantic Abort Landing/Abort Once Around/Abort to Orbit/Contingency Abort/Extra-vehicular activity), and so on. Still in this example, actionable variables include: engine throttle for each engine system, fuel levels (fuel can be dumped, weight (material can be dumped), choice of maneuver (to change altitude, attitude, flight angle, heading, etc), choice of procedure, and choice of orbit.

In this context, the present invention can be applied to recommend options that maximize the estimated chance of placing the satellite on the right orbit, landing without risk when coming back to earth, minimizing the overall cost of the mission, for instance by minimizing damages to the material, and minimizing incidents in the interior of the cabin susceptible to result in injuries or casualties of crew members.

In the preparation phase, many situations (deviations from the normal procedures) can be anticipated, for example by setting for any variable a different (theoretically possible) value than the normal value planned in the normal procedure. For each of these deviations, options can be generated. For example the procedure documented in the Flight Data File describes a large set of situations that are likely to occur and options that are likely to be selected. Other options result from a variety of other deviations from that procedure occurring at various stages after the initial deviation. For each of these options, an outcome can be calculated (e.g. the estimated chance of landing safe), for instance based on a simulation of the effect of the option.

In the present invention, all of these situations and outcomes are indexed. When a situation occurs, the options corresponding to the situation are selected by querying the index with the current value of the variables that describe the situation.

For instance, a component of the orbiter cooling system fails just after Main Engine Cut-off (its status is "out-of-order" instead of "in-order" in the planned procedure). Flight time is 8 min, altitude is 60 miles, shuttle speed is 16,697 mph (normal values at Main Engine Cut-off considering the normal procedure). That data, and the collected values of all other variables, allow querying the index and retrieve all relevant options, and rank them.

The operators can then rule out irrelevant options by making new queries, for instance, by ruling out contingency and transatlantic landing sites due to bad weather conditions. New recommendations leading to no landing or landing on viable sites are then sorted and displayed.

In this example, it is possible that the relatively small number of previous occurrences of satellite launch does not suffice to be representative of all situations that can occur in a satellite launch, and all decisions that can be taken in response to these situations. Past data on actual satellite launch alone would not suffice to train a model that would accurately estimate target values in any situation and associated options. However, to data on actual launches, can be added test data, and more importantly, simulation data. Simulations can be used to produce training data. Simulations are much less expensive than tests and actual launches and therefore can be carried out in a much larger number.

Simulations allow to directly inferring outcomes from situations and options. In this sense the use of a machine learning algorithm is not necessary to provide the model that estimates target values in this example (machine learning techniques provide means to build models based on empirical data, and simulation techniques provide means to build models based on mathematical modeling of physical properties).

However, even in this example, it is possible to use simulated data as training data for a machine learning model, and use the machine learning model at runtime to estimate the target value of newly generated situations and options. This method can advantageously provide target value estimates for situations and options that were not anticipated before the beginning of the flight, and typically provide these estimates much faster than what a full-blown simulation engine could do.

The invention claimed is:

1. A computer-implemented method for generating options, an option being a set of variables representing a state of a system at a given point of time, the method comprising:

collecting a set of data representing similar events by
collecting observations of similar events and/or generating observations of the similar events from a set of simulations, each observation describing an event by a set of variables related to the system, the observations having common variables;
selecting a model capable of receiving inputs and providing output in response to an input, the model being configured for predicting, based on an observation, a target value, a target value being a value of a target variable of an observation, a target variable being a variable providing information for understanding, predicting and/or reacting to behavior of the system;
training the selected model based on the set of data representing similar events;
generating options that represent hypothetical events, each option being a set of variables representing a state of the system at a given point of time;
computing target values by applying the trained model to the generated options;
computing an index for indexing the generated options and target values associated with the trained model;
querying the index for obtaining a selection of a set of options, the selection being performed according to a specific constraint, the constraint being a set of equalities and/or inequalities on values of variables of an option; and
returning, as a result of the query, a subset of the set of the generated options, the subset being ranked according to the target values associated with each option.

2. The computer-implemented method of claim 1, wherein the set of data representing similar events comprises a set of observations wherein each observation is defined with variables:
identifying target variables on the set of observations, a target variable being a variable;
identifying measurable variables in the set of observations, a measurable variable being a variable that can be measured in a current observation of a current event that is similar to the past events; and
identifying actionable variables on the set of observations, an actionable variable being a variable that can be acted upon based on a decision of a user.

3. The computer-implemented method of claim 2, wherein generating the options that represent hypothetical events comprises:
defining each variable of each observation as continuous segments or as discrete sets of possible values of the said each variable; and
generating the options by generating values on the defined segments or sets of possible values for the respective variables.

4. The computer-implemented method of claim 3, wherein generating the options further comprises, for each option to be generated:
selecting an event among the similar events represented by the set of data; and
setting a variable of the option to be generated based on the value of the variable of the selected event.

5. The computer-implemented method of claim 3, wherein the step of generating values is performed with the use of a random variate generator.

6. The computer-implemented method of claim 2, comprising:
determining dependencies between the variables of the observations of the set; and
removing events among the generated events whose variables do not satisfy the determined dependencies.

7. The computer-implemented method of claim 6, wherein one or more variables of one or more observations are transmitted in real time.

8. The computer-implemented method of claim 7, further comprising:
generating new options from the transmitted one or more variables;
computing new target values by applying the trained model to the new options generated; and
updating the index by indexing the generated new options and the computed new target values.

9. The computer-implemented method of claim 7, wherein the constraint according to which a selection is performed by querying the index applies to the variables transmitted in real-time and is set using the values transmitted in real-time.

10. A non-transitory computer readable storage medium having recorded thereon a computer program that when executed by a computer causes the computer to implement a method for generating options, an option being a set of variables representing a state of a system at a given point of time, the method comprising:
collecting a set of data representing similar events by collecting observations of similar events and/or generating observations of the similar events from a set of simulations, each observation describing an event by a set of variables related to the system, the observations having common variables;
selecting a model capable of receiving inputs and providing output in response to an input, the model being configured for predicting, based on an observation, a target value, a target value being a value of a target variable of an observation, a target variable being a variable providing information for understanding, predicting and/or reacting to behavior of the system;
training the selected model based on the set of data representing similar events;
generating options that represent hypothetical events, each option being a set of variables representing a state of the system at a given point of time;
computing target values by applying the trained model on the generated options;
computing an index for indexing the generated options and target values associated with the trained model;
querying the index for obtaining a selection of a set of options, the selection being performed according to a specific constraint, the constraint being a set of equalities and/or inequalities on values of variables of an option; and
returning, as a result of the query, a subset of the set of the generated options, the subset being ranked according to the target values associated with each option.

11. A server comprising:
processing circuitry coupled to a memory, the memory having recorded thereon a computer program for generating options, an option being a set of variables representing a state of a system at a given point of time, the processing circuitry implementing the computer program by being configured to:
collect a set of data representing similar events by collecting observations of similar events and/or generating observations of the similar events from a set of simulations, each observation describing an event by a set of variables related to the system, the observations having common variables;
select a model capable of receiving inputs and providing output in response to an input, the model being configured for predicting, based on an observation, a target value, a target value being a value of a target variable of an observation, a target variable being a variable providing information for understanding, predicting and/or reacting to behavior of the system;

train the selected model based on the set of data representing similar events;

generate options that represent hypothetical events, each option being a set of variables representing a state of the system at a given point of time;

compute target values by applying the trained model on the generated options;

compute an index for indexing the generated options and target values associated with the trained model;

query the index for obtaining a selection of a set of options, the selection being performed according to a specific constraint, the constraint being a set of equalities and/or inequalities on values of variables of an option; and return, as a result of the query, a subset of the set of the generated options, the subset being ranked according to the target values associated with each option.

12. The server of claim 11, wherein the server is connected to a client computer from which the query on the said index is generated.

* * * * *